United States Patent
Guleryuz et al.

(10) Patent No.: US 12,413,722 B2
(45) Date of Patent: Sep. 9, 2025

(54) FILTERING WITH SIDE-INFORMATION USING CONTEXTUALLY-DESIGNED FILTERS

(71) Applicant: Google LLC, Mountain View, CA (US)

(72) Inventors: Onur Guleryuz, San Francisco, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/686,155

(22) PCT Filed: Aug. 12, 2022

(86) PCT No.: PCT/US2022/040232
§ 371 (c)(1),
(2) Date: Feb. 23, 2024

(87) PCT Pub. No.: WO2023/043552
PCT Pub. Date: Mar. 23, 2023

(65) Prior Publication Data
US 2024/0357098 A1    Oct. 24, 2024

Related U.S. Application Data

(60) Provisional application No. 63/244,867, filed on Sep. 16, 2021.

(51) Int. Cl.
*H04N 7/12* (2006.01)
*H04N 19/117* (2014.01)
*H04N 19/124* (2014.01)
*H04N 19/136* (2014.01)
*H04N 19/82* (2014.01)

(52) U.S. Cl.
CPC ......... *H04N 19/117* (2014.11); *H04N 19/124* (2014.11); *H04N 19/136* (2014.11); *H04N 19/82* (2014.11)

(58) Field of Classification Search
CPC .................................................. H04N 19/182
See application file for complete search history.

(56) References Cited

U.S. PATENT DOCUMENTS

2011/0090242 A1    4/2011    Cote et al.
2018/0131968 A1    5/2018    Mukherjee

FOREIGN PATENT DOCUMENTS

EP        3516870 A1        7/2019

OTHER PUBLICATIONS

International Search Report and Written Opinion of International Application No. PCT/US2022/040232, dated Nov. 10, 2022, 13 pgs.

*Primary Examiner* — Y Lee
(74) *Attorney, Agent, or Firm* — Young Basile Hanlon & MacFarlane, P.C.

(57) ABSTRACT

Obtaining a restored frame from a degraded frame includes obtaining, for a pixel of the degraded frame, magnitude features based on a first window centered at the pixel. A cardinality N of the magnitude features is at least 1. The magnitude features are used to obtain a pixel-adaptive filter. The pixel-adaptive filter is applied to the pixel to obtain a pixel of the restored frame.

20 Claims, 11 Drawing Sheets

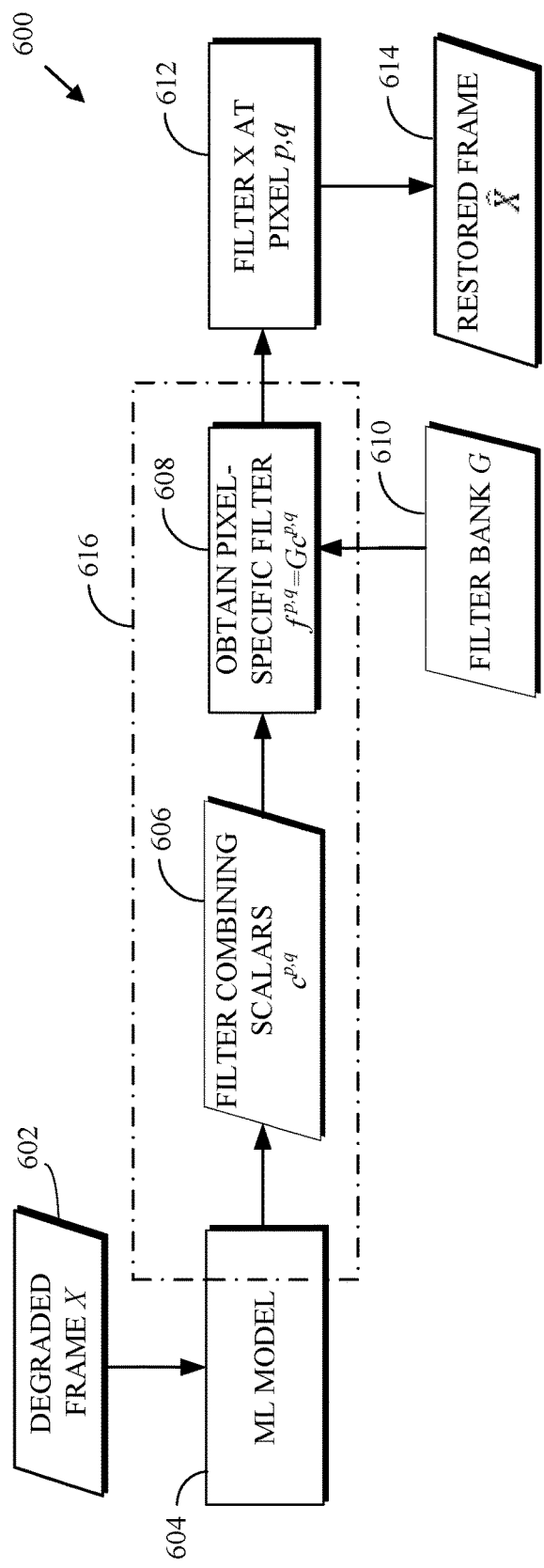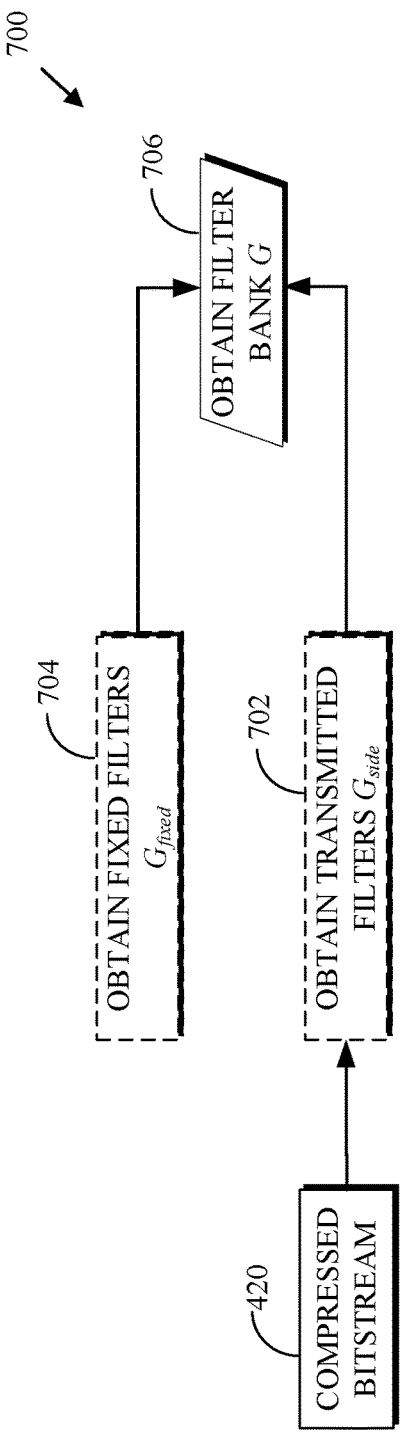
FIG. 6
FIG. 7

FILTERING WITH SIDE-INFORMATION USING CONTEXTUALLY-DESIGNED FILTERS

BACKGROUND

Digital video streams can represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding using compression can be performed by breaking frames or images into blocks that are then compressed, often using encoding techniques that result in loss of some data. A decoder can apply one or more filters to a reconstructed frame to remove or smooth out artifacts caused by (e.g., lossy) encoding.

SUMMARY

The disclosure relates in general to video coding, and in particular to filtering with side-information using contextually-designed filters.

A first aspect is a method for obtaining a restored frame from a degraded frame. The method includes obtaining, for a pixel of the degraded frame, magnitude features based on a first window centered at the pixel. A cardinality N of the magnitude features is at least 1. The method further includes using the magnitude features to obtain a pixel-adaptive filter and applying the pixel-adaptive filter to the pixel to obtain a pixel of the restored frame.

A second aspect is a method that includes obtaining a filter bank including filters, obtaining, for pixels of a degraded frame, respective sets of combining scalars for combining the filters of the filter bank, obtaining, for the pixels of the degraded frame, respective pixel-specific filters by combining the filters of the filter bank using the respective sets of combining scalars, and obtaining a restored frame by filtering the pixels of the degraded frame using the respective pixel-specific filters.

A third aspect is a device that includes a processor. The processor is configured to obtain, for a pixel of a degraded frame, magnitude features based on a first window centered at the pixel, use the magnitude features to obtain a pixel-adaptive filter, and apply the pixel-adaptive filter to the pixel to obtain a pixel of a restored frame.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings wherein like reference numerals refer to like parts throughout the several views.

FIG. 6 is a flowchart of an example of a technique of filtering using combining scalars.

FIG. 7 is a flowchart of an example of obtaining a filter bank G.

DETAILED DESCRIPTION

Figure 1:
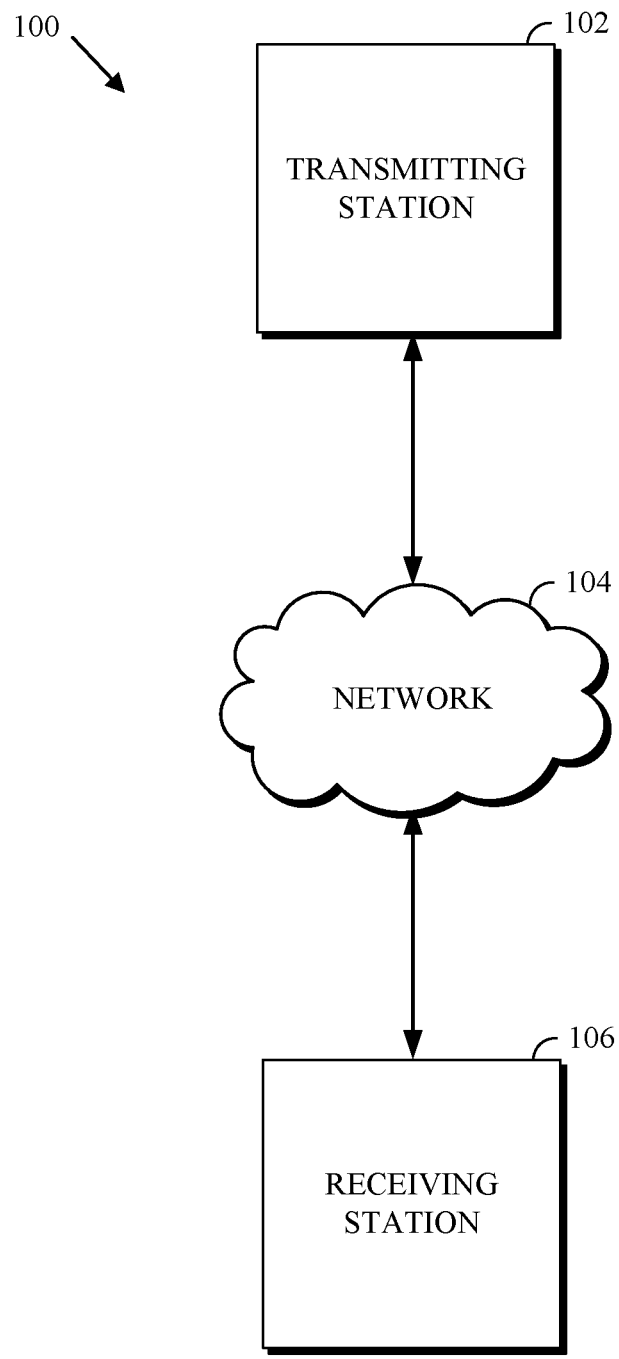
FIG. 1 is a schematic of a video encoding and decoding system.

As mentioned above, compression schemes related to coding video streams can include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream can be encoded based on identifying a difference (residual) between previously coded pixel values and those in the current block. In this way, only the residual and/or parameters used to generate the residual need be added to the bitstream instead of including the entirety of the current block. The residual can be encoded using a lossy quantization step. Decoding (i.e., reconstructing) an encoded block from such a residual often results in a distortion between the original (i.e., source) block and the reconstructed block.

Post-reconstruction loop filters can be used in various ways to improve reconstructed frames distorted or degraded as a result of the encoding and decoding processes. For example, in-loop deblocking filters can be used to modify pixel values near borders between blocks to limit the visibility of those borders within the reconstructed frame. Other loop filters can be used to bring the reconstructed images closer to the source images by, for example, adding offsets that are determined at the encoder to pixel values of the reconstructed frame. Those loop filters operate in a blind setting (i.e., without access to, or influence from, both a source frame and its associated reconstructed frame).

In traditional implementations, a set of fixed filters may be available at the decoder for applying to a decoded or a reconstructed frame (collectively, a degraded frame). One or more of the available filters may be applied by the decoder. In some other traditional implementations, the decoder may receive indications (e.g., indexes) of the one or more filters that the decoder is to apply. However, such traditional implementations do not further adapt the filter weights (also referred to as taps) or combine the filters in a way that is best adapted to the frame itself. That is, while the fixed filters may be designed to generally provide average improvements over a large set of frames, such fixed filters may not and cannot take into account peculiarities of certain frames.

Implementations according to this disclosure can filter a decoded frame of a video or an image (referred to herein as a "degraded frame") using pixel-adaptive filters to obtain a restored frame. A pixel-adaptive (or pixel-specific) filter can be obtained for at least some (e.g., each) pixel of the degraded image. The pixel-specific filter can be obtained by combining a set of filters (i.e., a filter bank) using pixel-specific combining scalars. The combining scalars for a pixel (or, equivalently, the pixel-adaptive filter for that pixel) are obtained based on local information (e.g., pixel values) in a neighborhood of the pixel (e.g., a window) that includes the pixel itself; hence the term "pixel-adaptive" filter.

In an example, a filter bank can include first filters (referred to herein as "fixed filters") available at the decoder, second filters (referred to herein as "side filters") received from an encoder in a compressed bitstream that includes the frame, or both (i.e., fixed filters and side filters). Pixels of the degraded frame are filtered using the respective pixel-specific filters to obtain the restored image.

Said another way, the combining (or combined) scalars for a pixel (more specifically, a pixel location) are obtained using the information (e.g., pixel values) at that pixel location and at least some of its surrounding (i.e., neighboring) pixels. The combining scalars can be obtained in any number of ways.

In an example, the combining scalars can be obtained using a machine learning (ML) model (e.g., a neural network) that is trained to receive a degraded frame and output, in an example, the combining scalars. Side-information may be used as further described herein. In other examples, the combining scalars can be obtained using (e.g., simple) features that do not require the computation complexity of neural networks. In an example, Wiener filters can be used to obtain the features. The Wiener filters aim to increase quality especially over directional features and textures in the decoded picture.

With respect to the ML model, the ML model can be trained to minimize errors between restored images and their corresponding source (i.e., original) images. To restate, the ML model can derive (e.g., calculate, infer, output, etc.) a vector of combining scalars at each pixel of the degraded frame. The respective combining scalars at each pixel are used to combine filters of a filter-bank to obtain a pixel-adaptive filter. As such, potentially different filters can be obtained at each pixel of the image. Said another way, the filter used for one pixel is independently derived from the filter derived for another pixel.

Pixel-adaptive filters can be applied to the pixels of the image at a neighborhood of the pixel to arrive at the filtered value for that pixel. In an example, the combining scalars may be obtained for a restoration unit or block. A restoration unit or a restoration block can be a luma block of size 256×256 pixels or a chroma block of size 128×128 pixels. Other restoration unit sizes are possible. A restoration unit may be defined as a portion of a reconstructed frame to which an in-loop filter is to be applied.

As used herein, a decoded frame or image is referred to as a "degraded frame" because it is not as close to the original (i.e., source) image as the restored frame. In an example, a decoder can filter the degraded frame with the aid of (e.g. using) side-information received in a compressed bitstream. In an example, the decoder can filter the degraded frame to obtain the restored frame in-loop (i.e., within the video compression loop). As such, the filtered pixels of the restored frame can be used in prediction of other pixels of other video frames.

Implementations according to this disclosure can realize (e.g., obtain) a very large number of filters with minimal computations and side-information that results in improved rate-distortion performance at lower computational complexity. Pixel-adaptive filtering can increase quality in decoded frames. In some situations (e.g., low bit rate situations), pixel-adaptive filtering can improve performance without side-information by relying solely on finely characterized pixel contexts.

As such, described herein are in-loop filtering techniques that may be used to augment or replace loop restoration processes used by codecs. Improved performance at both high and low bitrates can be obtained. The filters obtained according to this disclosure are non-separable filters. Separable filters may perform well for horizontal and vertical lines or edges. However, when a restoration unit includes directional lines (i.e., non-horizontal or non-vertical lines), separable filters do to not perform well.

Filtering with side-information using contextually-designed filters is described herein first with reference to a system in which the teachings can be incorporated. As alluded to above, in the restoration herein, the frame can be restored in one or more portions. Each of these portions is referred to herein respectively as a "restoration unit," where restoration units may overlap or may not overlap each other.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
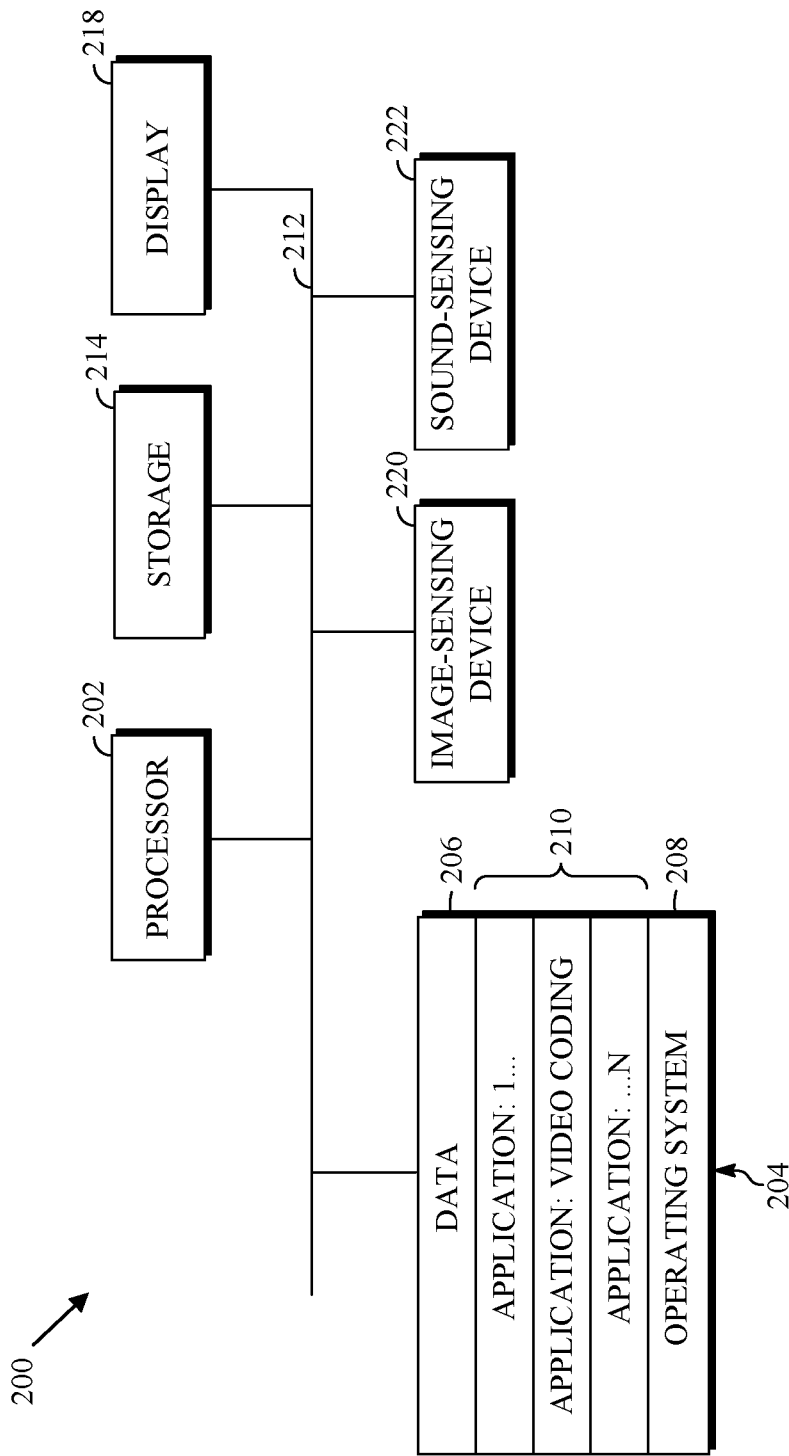
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP can be used, e.g., an HTTP-based video streaming protocol.

When used in a video conferencing system, for example, the transmitting station 102 and/or the receiving station 106 can include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
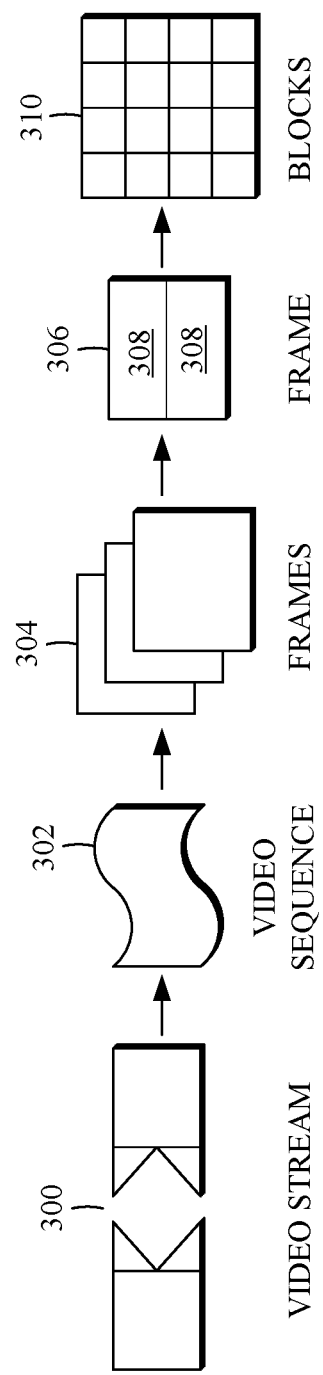
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 can be sampled at different resolutions.

Whether or not the frame 306 is divided into the segments 308, the frame 306 can be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
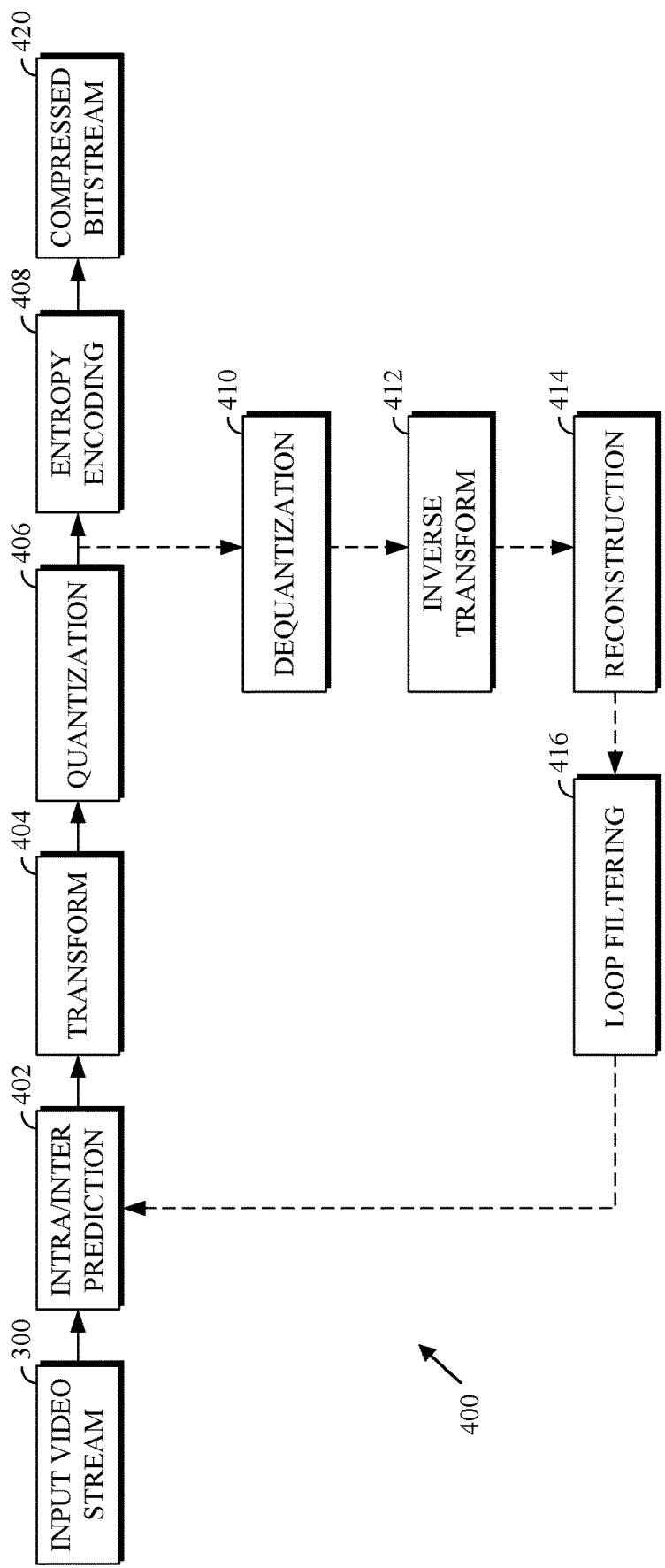
FIG. 4 is a block diagram of an encoder.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 can also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block can be formed from samples in the current frame that have been previously encoded and reconstructed. In the case of inter-prediction, all or part of a prediction block can be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms can be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, can be different from the size of the transform block. For example, the prediction block can be split into smaller blocks to which separate transforms are applied.

The quantization stage 406 converts the transform coefficients into discrete quantum values, which are referred to as quantized transform coefficients, using a quantizer value or a quantization level. For example, the transform coefficients can be divided by the quantizer value and truncated. The quantized transform coefficients are then entropy encoded by the entropy encoding stage 408. Entropy coding can be performed using any number of techniques, including token and binary trees. The entropy-encoded coefficients, together with other information used to decode the block, which can include for example the type of prediction used, transform type, motion vectors and quantizer value, are then output to the compressed bitstream 420. The information to decode the block can be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
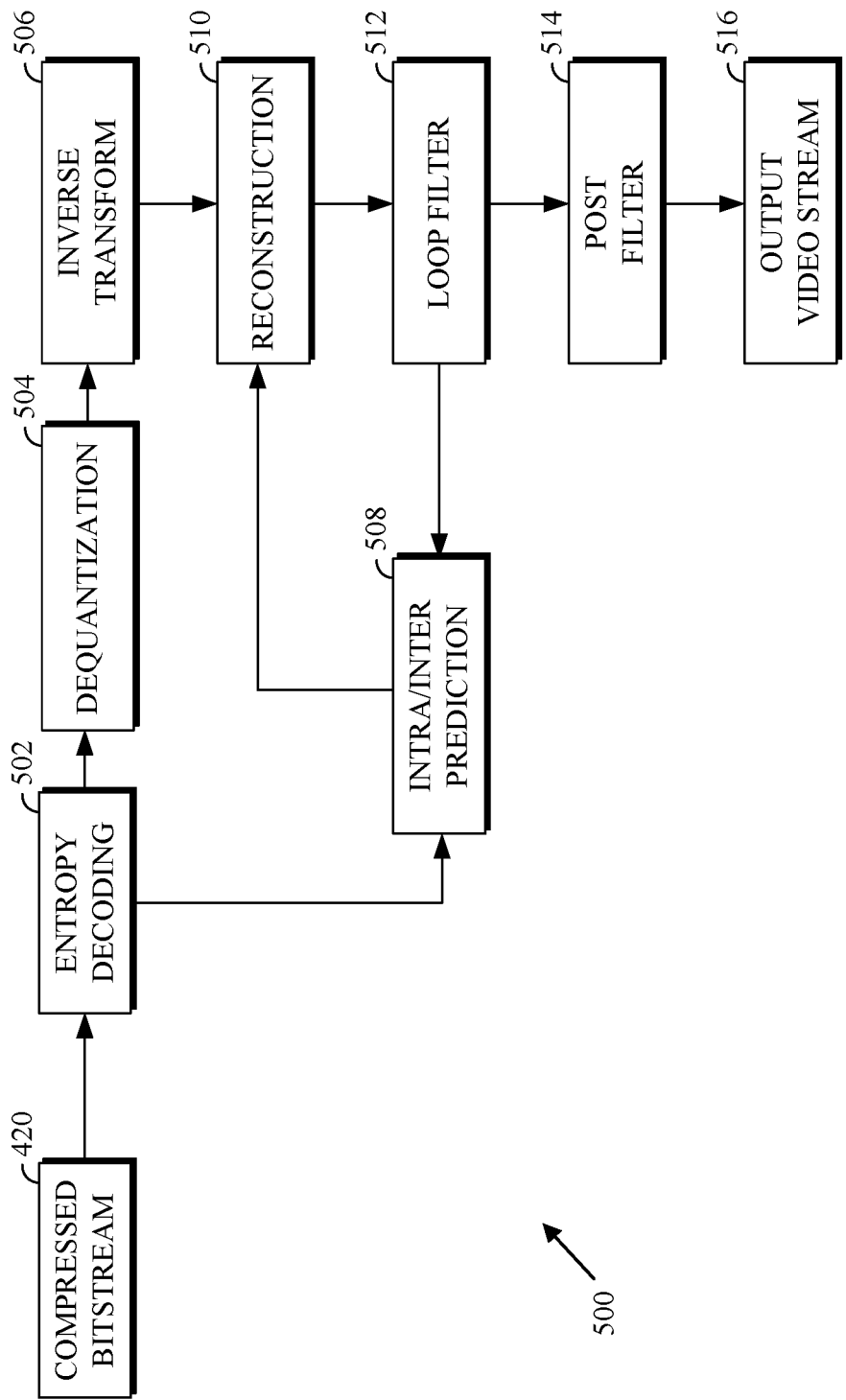
FIG. 5 is a block diagram of a decoder.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 10 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and an optional post filtering stage 514. Other structural variations of the decoder 500 can be used to decode the compressed bitstream 420. The loop filtering stage 512 can include a deblocking filtering stage.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 is applied to the reconstructed block to reduce blocking distortion as described below, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied before the loop filtering stage 512. Additionally, or alternatively, the encoder 400 includes a deblocking filtering stage in addition to the loop filtering stage 416.

FIG. 6 is a flowchart of an example of a technique 600 of filtering using combining scalars. Filtering using combining scalars can be implemented by a loop filtering stage, such as the loop filtering stage 416 of FIG. 4 or the loop filtering stage 512 of FIG. 5. Filtering using combining scalars can be implemented by a reconstruction stage, such as the reconstruction stage 510 of FIG. 5 or the reconstruction stage 414 of FIG. 4.

A degraded frame 602 is input to an ML model 604. In different implementations, the ML model 604 can be trained to use different types of data as inputs. In an example, the ML model 604 may be trained to use, as input, a frame that is the output of a traditional loop filtering stage (i.e., a loop filtering stage that does not include obtaining a restored frame as described herein). As such, the degraded frame 602 can be the output of the loop filtering stage. In an example, the ML model 604 may be trained to use, as input, a frame that is the output of the reconstruction stage. As such, the degraded frame 602 can be the output of the reconstruction phase. The training of the ML model 604 is further described below. The degraded frame has a size of P×Q and each pixel can be at a location (p, q), where p=0, . . . , P−1 and q=0, . . . , Q−1. In an example, the inputs to the ML model may be restoration units. In yet another example, the ML model may partition an input frame into restoration units.

The ML model 604 outputs combining scalars 606 (i.e., combining scalars $c^{p,q}$) for each pixel of the degraded frame. For each pixel (p, q) (i.e., the pixel at the Cartesian location (p, q)), the ML model 604 outputs N values, where N is the number of filters of a filter bank G. Obtaining the filter bank G is described below with respect to FIG. 7. The combining scalars $c^{p,q}$ can be conveniently denoted as a column vector of size N×1. The combining vectors $c^{p,q}$ for the pixel at Cartesian location (p, q) of the degraded frame can be given by equation (1). As such, the ML model 604 can output a total of P*Q combining scalars where each of the P*Q combining scalars includes N scalers (e.g., numbers, values, multipliers). As such, the ML model 604 can output a total of P*Q*N values.

$$c^{p,q} = \begin{bmatrix} c_1^{p,q} \\ c_2^{p,q} \\ \vdots \\ c_N^{p,q} \end{bmatrix} \quad (1)$$

At 608, for each pixel at (p, q), a respective filter $f^{p,q}$ is obtained by combining the N filters of a filter bank 610 (i.e., the filter bank G) using the combining scalars $c^{p,q}$. Each of the filters of the filter bank G includes K taps (e.g., weights)—one tap for each of the pixels of a neighborhood of the pixel (p, q). To illustrate, if the neighborhood is a window of size K=A×B in size (e.g., K=3×5), where A is the number of rows and B is the number of columns, then each filter of the filter bank G includes K=A*B (e.g., K=3*5=15)

weights. The window can be a 3×3, 5×5, 7×7, or of some other size. The size of the window can be chosen based on a desired complexity. That is, K can be complexity dependent. While a pixel neighborhood may be 2-dimensional, each filter ($g_i$) of the filter bank can be represented as a 1-dimensional K×1 column vector as shown in equation (2).

$$g_i = \begin{bmatrix} g_{i,1} \\ g_{i,2} \\ \vdots \\ g_{i,K} \end{bmatrix} \quad (2)$$

In equation (2), each weight $g_{i,j}$ corresponds (or is used as a multiplier for) a corresponding pixel of the window. To illustrate, assume that the window is a square window of size 3×3. As such, K=9. With respect to the pixel (p, q), the window includes, in raster scan order, the pixels at Cartesian locations (p−1,q−1), (p−1,q), (p−1, q+1), (p, q−1), (p, q), (p, q+1), (p+1, q−1), (p+1, q), and (p+1, q+1). Thus, the weight $g_{i,1}$ corresponds to (e.g., is used for) the pixel at location, (p−1,q−1); the weight $g_{i,2}$ corresponds to the pixel at location, (p−1,q); . . . ; the weight $g_{i,6}$ corresponds to pixel at location, (p, q+1); . . . ; and the weight $g_{i,K}$ corresponds to the pixel at location, (p+1, q+1).

It is noted that, while described herein that a neighborhood of a pixel is a square or a rectangular set of pixels, the disclosure is not so limited and the neighborhood of a pixel at (p, q) can be any set of pixels that are proximal to the pixel at (p, q). For example, the neighborhood can include the pixel and its immediate (i.e., top, left, right, and bottom) neighboring pixels and not include any diagonally adjacent pixels of the pixel. In another example, the neighborhood can include pixels in a same row or pixels in a same column as the pixel, but not both. The weights of the column vector can be arranged in a lexicographical order, such as a raster scan order.

FIG. 7 is a flowchart 700 of an example of obtaining a filter bank G. As mentioned above, the filter bank can include at least one of fixed filters ($G_{fixed}$) or filters received in a compressed bitstream ($G_{side}$).

At 702, the side filters $G_{side}$ are optionally obtained (e.g., decoded) from a compressed bitstream, such as the compressed bitstream 420 of FIG. 5. An encoder, such as the encoder 400 of FIG. 4 may transmit the side filters $G_{side}$ in the compressed bitstream. The compressed bitstream may or may not include side filters. Whereas the fixed filters $G_{fixed}$ may generally improve most images, the side filters $G_{side}$ are determined by the encoder to improve the particular image (or video sequence) being decoded.

The encoder may generate side filters $G_{side}$ in situations where the encoder determines that the compression performance can be improved using side filters $G_{side}$, or more generally, filter-related information. That is, the generated side filters $G_{side}$ can improve the compression performance over only using (if at all) the fixed filters $G_{fixed}$.

Obtaining the side filters $G_{side}$ from the compressed bitstream can mean decoding the respective weights of the side filters $G_{side}$ from the compressed bitstream. As such, and assuming that the number of side filers is s, then the compressed bitstream can include up to s*K weights. The compressed bitstream can include a syntax element indicating the number of side filters to be decoded. The side filters $G_{side}$ can be conveniently represented, as shown in equation (3), as a matrix where each element $g_i$ is a column vector that includes the weights of the filter, as described with respect to equation (2).

$$G_{side} = [g_1, \ldots, g_s], \text{ where } s \text{ is the number of side filters} \quad (3)$$

At 704, the fixed filters $G_{fixed}$ are optionally obtained (e.g., retrieved). The fixed filters $G_{fixed}$ can be filters that are designed a priori and can be known and/or available for use by an encoder and a decoder. The fixed filters $G_{fixed}$ can be designed to generally improve many different images. The fixed filters $G_{fixed}$ includes (N−s) filters. The fixed filters $G_{fixed}$ can be conveniently represented, as shown in equation (4), as a matrix where each element $g_i$ is a column vector that includes the weights of the filter, as described with respect to equation (2).

$$G_{fixed} = [g_{s+1}, \ldots, g_N], \text{ where } N \text{ is the total number of filters} \quad (4)$$

In an example, whether to use or not to use any of the fixed filters $G_{fixed}$ may be transmitted in the compressed bitstream. For example, the compressed bitstream can include one or more syntax elements that the decoder can use to determine whether to use the fixed filters $G_{fixed}$. In another example, the combing scalars determine whether, which, and to what extent the fixed filters $G_{fixed}$ are used. That is, the values of the combining scalars determine whether, and to what extent, each fixed filter is utilized. For example, if the ML model 604 infers that the fixed filters $G_{fixed}$ do not improve the degraded frame 602, then the ML model 604 may output combining scalars corresponding to the fixed filters $G_{fixed}$ having zero values. To illustrate, assume that the filter $g_5$ placed in the $5^{th}$ column of the filter bank G (described below) will not be utilized with any of the pixels of the degraded frame 602, then all $c_5^{p,q}$ output by the ML model 604 will be zero.

At 706, the filter bank G (i.e., the filter bank 610 of FIG. 6) is obtained. In an example, the filter bank can be obtained by placing the $G_{side}$ and the $G_{fixed}$ matrices side-by-side, as shown in equation (5).

$$G = [G\_side \mid G\_fixed] \quad (5)$$

The encoder can determine the most beneficial side information regarding side filters (and side combining scalars, which are described below) using any number of techniques. For example, using peak signal-to-noise ratio (PSNR) and/or any error metric (e.g., sum of the mean squared error, sum of absolute differences error), the encoder can determine the side filters that are the best at minimizing the error metric. To illustrate, and without limitations, in a case that the error is greater than a threshold, the encoder may increase the side information, such as by sending additional filters instead of a current number of filters. The encoder may further modify the combining scalars to determine whether the modifications reduce the errors. In an example, the encoder may add one (or more values) to at least some of the combining scalars obtained from the ML model. The encoder may determine how much side information to transmit based on a rate-distortion calculation. For example, the encoder may obtain the optimal side information to transmit ignoring any rate limitations and then determine the subset of the side information to transmit based on an available number of bits balanced with the distortion reduction that results therefrom.

Referring again to 608 of FIG. 6, a filter $f^{p,q}$ for the pixel at location (p, q) can be obtained using equation (6). As such, from the N filters of the filter bank G, one filter $f^{p,q}$ is obtained.

$$f^{p,q} = Gc^{p,q} \quad (6)$$

To illustrate, and without limitations, assume that there are 2 side filters, $g_1$ and $g_2$, one fixed filter $g_3$, and that the window size K is 5. As such, $f^{p,q}$ for the pixel at (p=5, q=67) can be obtained using equation (7).

$$f^{5,67} = \begin{bmatrix} g_{1,1} & g_{2,1} & g_{3,1} \\ g_{1,2} & g_{2,2} & g_{3,2} \\ g_{1,3} & g_{2,3} & g_{3,3} \\ g_{1,4} & g_{2,4} & g_{3,4} \\ g_{1,5} & g_{2,5} & g_{3,5} \end{bmatrix} \begin{bmatrix} c_1^{5,67} \\ c_2^{5,67} \\ c_3^{5,67} \end{bmatrix} \quad (7)$$

At 612, each pixel value x(p, q) of the degraded frame 602 is filtered using its respective filter $f^{p,q}$ to obtain a corresponding restored pixel value $\hat{x}(p, q)$ of a restored frame 614. In an example, and in the case of $K=k^2$ filters defined within a k×k window, the linear convolution operation of equation (8) can be used.

$$\hat{x}(p, q) = \sum_{m,n=0}^{k-1} x\left(p + m - \frac{k}{2}, q + n - \frac{k}{2}\right) f^{p,q}(m*k + n + 1) \quad (8)$$

Returning briefly to the ML model 604, the ML model 604 can be trained to minimize the error between restored frames obtained using equation (8) and the corresponding source (i.e., original) frames as the ML model (i.e., the combining scalars output therefrom) attempts to make the restored frame as close to the original frame as possible. The error can be backpropagated through the ML model 604 to adjust the weights of the ML model.

In some implementations, the side filters can be transmitted at the frame level, as already alluded to. In another example, the side filters can be transmitted at the block level. As such, respective side filters may be transmitted for at least some of the blocks of the degraded frame. In an example, the side filters may be transmitted for a group-of-pictures (GOP). As such, the same side filters $G_{side}$ are used for each frame of the GOP.

As already described with respect to equation (5), the side filters $G_{side}$ are used to expand the filter bank of the fixed filters $G_{fixed}$. In another example, the side filters $G_{side}$ can be transmitted as differential filters on top of the fixed filters, as shown in equation 5'.

$$G = G_{fixed} + G_{side} \quad (5')$$

As such, each combining scalars $c^{p,q}$ output by the ML model 604 includes a number of scalars that is equal to the number of filters in the fixed filters $G_{fixed}$. Alternatively, the ML model 604 may output more scalars than the number of fixed filters and any scalars not corresponding to the fixed filters can be ignored.

One or more syntax elements of the bitstream can be used by the decoder to determine how the side filters $G_{side}$ are to be used. For example, a first value of the syntax element can indicate that the side filters are expanding filters (e.g., equation (5)), a second value of the syntax can indicate that the side filters are differential filters (e.g., equation (5')), and so on. The encoder may determine to use and transmit expanding filters in a case where the fixed filters do not produce a restored frame that is sufficiently close to the original frame and, as such, the encoder transmits more filters to be used by the decoder. The encoder may determine that additional slight improvements can be obtained in addition to using the fixed filters and, as such, the encoder transmits adjustments to some (e.g., a few) of the tap values of some of the fixed filters.

In an example, the encoder may transmit, and the decoder may use, differentials $\delta^{p,q}$ for the combining scalars. The encoder may determine that transmitting the differential combining scalars $\delta^{p,q}$ can further improve the restored frame 614. The ML model 604 may be trained on many video sequences (i.e., frames of the video sequences). However, the current video sequence may be sufficiently different from the training images and the encoder may determine that the output of the ML model 604 can be improved upon. As such, the encoder may determine to transmit, for at least some of the pixels of the degraded frame 602, respective updates. For most of the pixels, the updates may be zero values (i.e., $\delta\_i\hat{}(p, q)=0$). However, for other pixels, the respective updates will not be zero (i.e., $\delta_i^{p,q}\neq 0$). The differential combining scalars $\delta^{p,q}$ can be used to update the combining scalars $c^{p,q}$ output by the ML model 604 to obtain updated combining scalars $\tilde{c}^{p,q}$, as shown in equation (9). The updated combining scalars $\tilde{c}^{p,q}$ are then used to obtain the pixel-specific filters, as shown in equation (6').

$$\tilde{c}^{p,q} = c^{p,q} + \delta^{p,q} \quad (9)$$

$$f^{p,q} = G\tilde{c}^{p,q} \quad (6')$$

In another example, pixel-specific filters can be derived for groups of pixels rather than, as already described, for individual pixels. As such, each pixel in the group can be filtered with the group-specific filter. For example, a group of pixels can be a B×B block of pixels and one filter f is obtained and used for each pixel of the block. This results in one filter per B*B pixels therewith reducing derivation-related calculations.

In another example, the ML model 604 can be trained to output for each pixel location, in addition to the N combining scalars $c^{p,q}$, a pixel offset $x_{offset}^{p,q}$. The pixel offset $x_{offset}^{p,q}$ can be added to the filtered pixel $\hat{x}(p, q)$. As such, the pixel values of the restored frame 614 can be given by equation (8').

$$\tilde{x}'(p, q) = \tilde{x}(p, q) + x_{offset}^{p,q} \quad (8')$$

Figure 8:
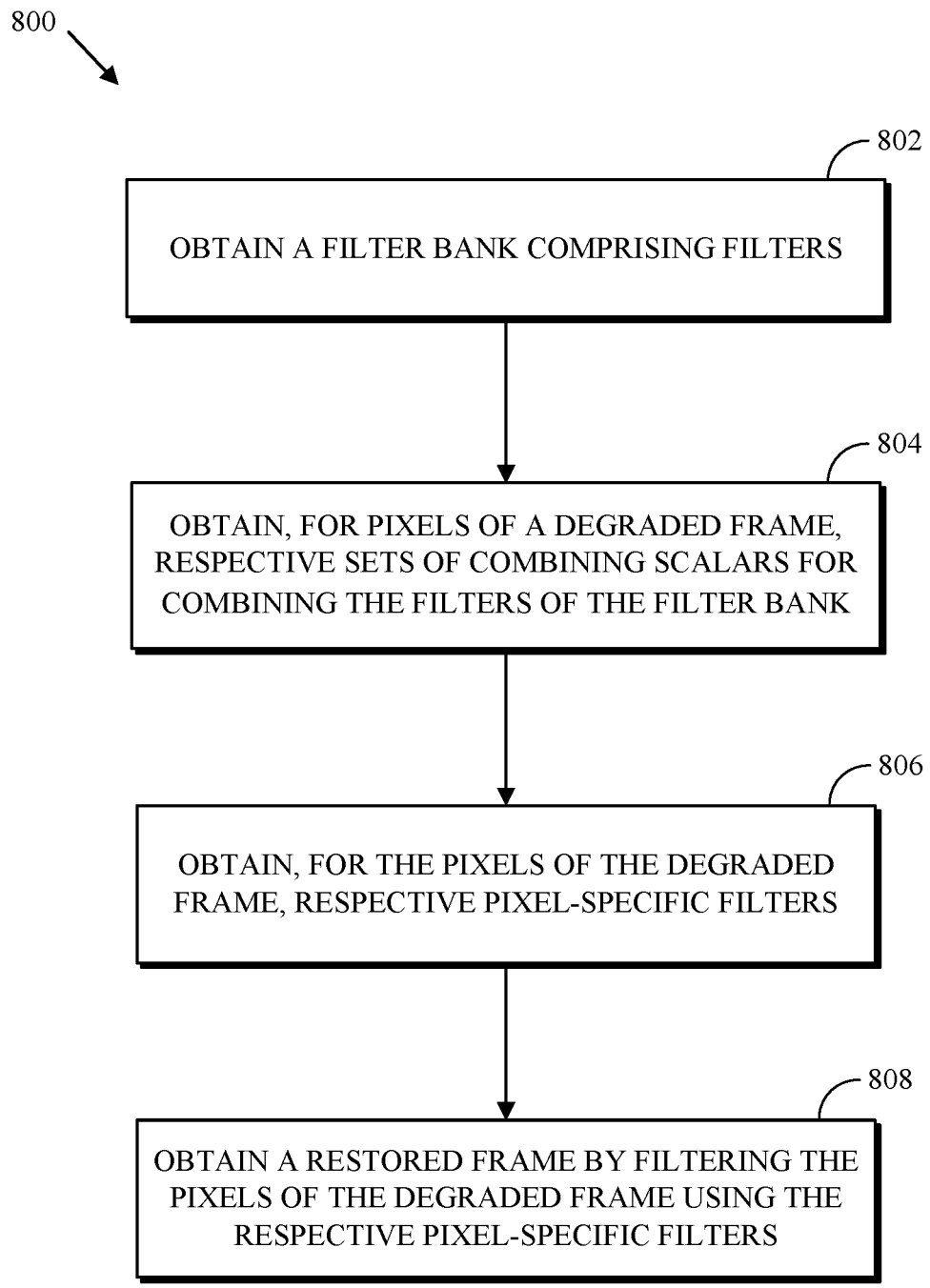
FIG. 8 is a flowchart of a technique for restoring a degraded frame.

FIG. 8 is a flowchart of a technique 800 for restoring a degraded frame. The technique 800 can be implemented in a decoder such as the decoder 500 and can be implemented, for example, as a software program that can be executed by computing devices (e.g., apparatuses) such as receiving station 106. The software program can include machine-readable instructions that can be stored in a memory (e.g., a non-transitory computer-readable storage medium) such as the memory 204 or the secondary storage 214, and that can be executed by a processor, such as CPU 202, to cause the computing device to perform the technique 800. In at least some implementations, the technique 800 can be performed in whole or in part by the reconstruction stage 510 of the decoder 500 of FIG. 5. In at least some implementations, the technique 800 can be performed in whole or in part by the loop filtering stage 512 of the decoder 500 of FIG. 5.

The technique 800 can be implemented using specialized hardware or firmware. Some computing devices can have multiple memories, multiple processors, or both. The steps or operations of the technique 800 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 802, a filter bank that includes filters is obtained. The filter bank can be as described with respect to the filter bank G of FIG. 6. In an example, the filter bank can include side filters decoded from a compressed bitstream. The side filters can be as described with respect to $G_{side}$ and can be obtained as described with respect to 702 of FIG. 7. In an example, the filter bank can further include fixed filters available at a decoder, as described with respect to $G_{fixed}$, which can be obtained as described with respect to 704 of FIG. 7. As such, the filter bank can be obtained as described with respect to equation (5).

At 804, respective sets of combining scalars for combining the filters of the filter bank can be obtained for pixels of a degraded frame. In an example, a respective set of combining filters can be obtained for each pixel of the degraded frame. Each set of combining scalars can be as described with respect to $c^{p,q}$ above. At 806, respective pixel-specific filters can be obtained for the pixels of the degraded frame by combining the filters of the filter bank using the respective sets of combining scalars, as described with respect to equation (6). At 808, a restored frame is obtained by filtering the pixels of the degraded frame using the respective pixel-specific filters. The restored frame can be the restored frame 614 of FIG. 6, which can be obtained using equation (8).

Returning again to FIG. 6, in an example, look-up-tables (LUTs) can be used to significantly accelerate computations in an area 616. As can be appreciated, the process described with respect to FIG. 6 performs many calculations including those performed by the ML model 604. To reduce the computational complexity, LUTs can be used to look up, rather than perform to obtain, calculation results (or approximations thereof). As can also be appreciated, the LUTs cannot be infinitely large to account for all possible input values. As such, the operands of operations (e.g., multiplications, convolutions) performed within the area 616 may be quantized to nearest values for lookup in the LUTs.

Figure 9:
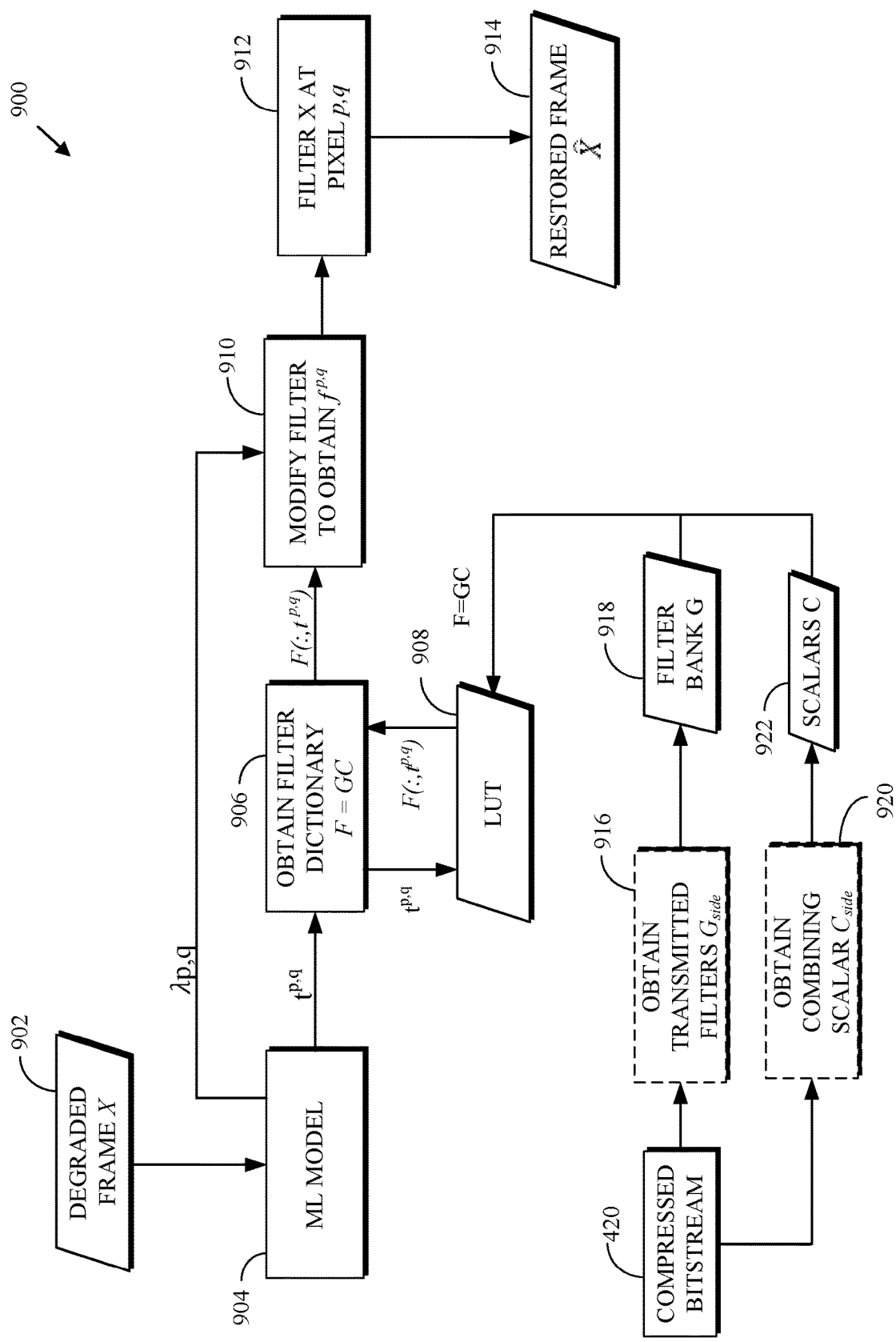
FIG. 9 is a flowchart of an example of a technique 900 for filtering with pixel-specific filters obtained using a look-up-table.

FIG. 9 is a flowchart of an example of a technique 900 for filtering with pixel-specific filters obtained using a LUT. The technique 900 can be implemented by a loop filtering stage, such as the loop filtering stage 416 of FIG. 4 or the loop filtering stage 512 of FIG. 5. Filtering using combining scalars can be implemented by a reconstruction stage, such as the reconstruction stage 510 of FIG. 5 or the reconstruction stage 414 of FIG. 4.

The technique 900 obtains, for a degraded frame 902, pixel-specific filters $f^{p,q}$ that are used, at 912 (which can be or be similar to 612 of FIG. 6), to filter the pixels of a degraded frame 902 (which can be or be similar to the degraded frame 602 of FIG. 6) to obtain a restored frame 914 (which can be or be similar to the restored frame 614 of FIG. 6).

An ML model 904 receives a degraded frame 902. Whereas the ML model 604 of FIG. 6 outputs, for pixels of the degraded frame 602, respective combining scalars $c^{p,q}$ that are vectors of values, the ML model 904 outputs an index $t^{p,q}$ per pixel. The index $t^{p,q}$ is used, at 906, as an index into a LUT 908 to obtain pre-computed (and stored) combining scalars $c_{fixed}^{p,q}$. $C_{fixed}$ (i.e., "fixed combining scalars") refers to the combining scalars obtained from the LUT 908 using all of the $t^{p,q}$ indexes. The ML model 904 may also output a filter modifier $\lambda^{p,q}$ for each pixel, which is explained further below.

As described above, the compressed bitstream 420 may include side filters $G_{side}$. In such a case, at 916, the technique 900 decodes the side filters $G_{side}$ from the compressed bitstream 420. At 918, the filter bank G can be obtained by combining the side filters $G_{side}$ (e.g., if any) and the fixed filters $G_{fixed}$, as described above, such as with respect to equation (5) or equation (5').

As also described above, the compressed bitstream 420 may include information that may be used to update the combining scalars. As such, at 920, the combining scalar side information $C_{side}$ may be decoded from the compressed bitstream. At 922, the fixed combining scalars $C_{fixed}$ can be combined with the scalar side information $C_{side}$ (if any) to obtain a combining scalar matrix C. $C_{side}$ and $C_{fixed}$ can be combined in an expanding, a differential way, or some other way, depending on a syntax value of the compressed bitstream. The combining scalar matrix C is used with the filter bank G (i.e., F=GC) along with the indexes $t^{p,q}$ as input to the LUT 908 to obtain pixel-specific stored filters $F(:, t^{p,q})$.

At 910, the pixel-specific stored filters $F(:, t^{p,q})$ can be modified using the filter modifier $\lambda^{p,q}$ to obtain the pixel-specific filter $f^{p,q}$, which is used to filter the pixel at location (p, q) of the degraded frame 902.

To restate, whereas the ML model 604 performs complicated computations to generate N numbers per pixel (i.e., $c^{p,q}$), the ML model 904 generates one number $t^{p,q}$ per pixel, which can be immediately used to obtain from the LUT 908 a pixel-specific stored filters $F(:, t^{p,q})$. Depending on the structure of the LUT, the pixel-specific stored filters $F(:, t^{p,q})$ may be stored as rows or columns in the LUT 908. The filter modifier $\lambda^{p,q}$ is then used to modify the stored pixel-specific filter.

As mentioned above, in some examples, the combining scalars $c^{p,q}$ can be obtained using techniques other than a neural network.

Let $p_{k,l}$(L×1) denote a vector formed by a patch around a pixel at (k, l) of a restoration unit. Additionally, assume that H (of size L×L) is an orthonormal transform and T>0 is a given threshold. Well-known orthonormal-transform-and-hard-threshold-based denoising of this patch reconstructs the vector $\hat{p}_{k,l}$ as given by equation (10), where $h_i$, i= 1, ..., L are the columns of H.

$$\hat{p}_{k,l} = p_{k,l} - \sum_{\{i:|h_i^T p_{k,l}|<T\}} h_i^T p_{k,l} h_i = p_{k,l} - \left(\sum_{\{i:|h_i^T p_{k,l}|<T\}} h_i h_i^T\right) p_{k,l} \quad (10)$$

Considering one of the components (i.e., n) of $p_{k,l}$ that corresponds to the pixel (k, l) within the patch, the reconstructed pixel $\hat{p}_{k,l}(n)$ can be calculated using equation (11).

$$\hat{p}_{k,l}(n) = p_{k,l}(n) - \left(\sum_{\{i:|h_i^T p_{k,l}|<T\}} h_i(n) h_i^T\right) p_{k,l} = P_{k,l}(n) - f_n^T p_{k,l} \quad (11)$$

$$\text{where } f_n = \sum_{\{i:|h_i^T p_{k,l}|<T\}} h_i(n) h_i^T$$

In equation (11), $f_n$ can be considered a pixel-adaptive filter. The pixel-adaptive filter $f_n$ can be realized by steps including evaluating features $|h_i^T p_{k,l}|$, comparing these features to thresholds, forming the appropriate filter using equation (11), and finally forming the reconstructed pixel value.

Considering equation (11), the pixel-adaptive filter can be observed to be constructed (e.g., put together) using L features, where each feature independently contributes to an incremental component of the filter. Considering, by way of a non-limiting example, a patch size of 7×7 pixels, L=49 may lead to substantial complexity at an encoder and a decoder.

Implementations according to this disclosure can use a few number of features F. In an example, F=4. The features F are such that they are used jointly in determining the pixel-adaptive filter for a pixel. In an example, the features can be quantized and combined for use in a lookup table (LUT) of filters. The features F can be considered to be equivalent to the combining scalars $c^{p,q}$ described above; and the process described with respect to obtaining the features can be considered to be a simplification of the neural network using to obtain the combining scalars $c^{p,q}$.

Specifically, quantized features $w_i$ using equation (12) can be obtained. The quantized features $w_i$ can be used to determine the pixel-adaptive filter using equation (13).

$$w_i = \varrho(|g_i^T p_{k,l}| - T_i), i = 1, \ldots, 4 \quad (12)$$

$$f_{k,l} = LUT(w_1, w_2, w_3, w_4) \quad (13)$$

In equation (12), $\varrho$ is a quantization function, $g_i$ are feature generation projections, $T_i$ are thresholds, and $|g_i^T p_{k,l}|$ can be considered to be the features F corresponding to the combining scalars. In equation (13), $f_{k,l}$ is the pixel adaptive filter to be applied to the pixel (k, l). The thresholds $T_i$ can be considered to be similar to regularization parameter that may typically be used when training a neural network. The filter $f_{k,l}$ is obtained from the lookup table using the function LUT, which takes the quantized features $w_i$ as input.

The quantization function $\varrho$ used in equation (12) can depend on the number of features, the number of entries in the LUT, or both. To illustrate, assume that the LUT includes 4096 entries (i.e., filters). As four features are used in equation (12), the quantization function $\varrho$ can be an eight-level quantizer. As such, each of the feature values can be quantized to a value between 0 and 7, therewith obtaining a total of $8*8*8*8 = 8^4 = 4096$ possible combination of values. Obtaining a value between 0 and 4095 for a pixel can essentially be understood to, in effect, classify the pixel or, more accurately, the neighborhood of the pixel into one of the 4096 possibilities.

In another example, the LUT table may include 256 entries and LUT(.) function may map an input value that is in the range [0, 4095] to one of the 256 filters. The quantized feature values obtained using equation (12) can be used in equation (13) to obtain a filter based on the feature values. The quantized feature values may be combined in any number of ways. In an example, each of feature values may be quantized into 3 bits therewith obtaining a 12-bit value that can be obtained by concatenating the bits of the quantized feature values. The 12-bit value can be used as an input to the LUT(·) of equation (13).

The filters of the LUT can be obtained using offline training. A training set of patches can be used to optimize the filters over a range of quality levels. In an example, the training set can be formed using 30 frames each from primarily 720p and 1080p video sequences. The thresholds $T_i$ may be optimized for each quality level. In an example, and in order to further streamline computations, simple projections $g_i$ can be formed by the one-dimensional $[-1, 2, -1]$ gradient filter configured on horizontal, vertical, diagonal, and anti-diagonal directions and computing respective averages over each patch. More generally, projections (e.g., filters) that can highlight high frequency areas (e.g., pixel neighborhoods) can be used. For example, Laplacian-like operators, which can act as second derivatives, can be used.

In another example, simple projections can be used (e.g., combined) to obtain more complex features. Gradient filters using a small number of taps can be operated (e.g., applied), with respect to a pixel, in at least some of the horizontal, vertical, diagonal, and anti-diagonal directions. In an example, the number of taps can be 3. In an example, the filter weights of all of the filters can be $[-1, 2, -1]$. However, that need not be the case and different directions can use different weights, different number of taps, or both.

For at least some (e.g., each) of the pixels, an averaged magnitude of each filter leads to a classification feature. In some examples, thresholds can be subtracted from the classification features and the results can be used to consult a filter lookup-table (LUT). The thresholds can be imperially derived. The LUT in turn yields an origin-symmetric non-separable filter. The derived filter is then used to obtain the filtered output at that pixel. The encoder and decoder perform the same set of calculations in deriving the filter. The decoder only performs the calculation on RUs where the mode is signaled.

Figure 10:
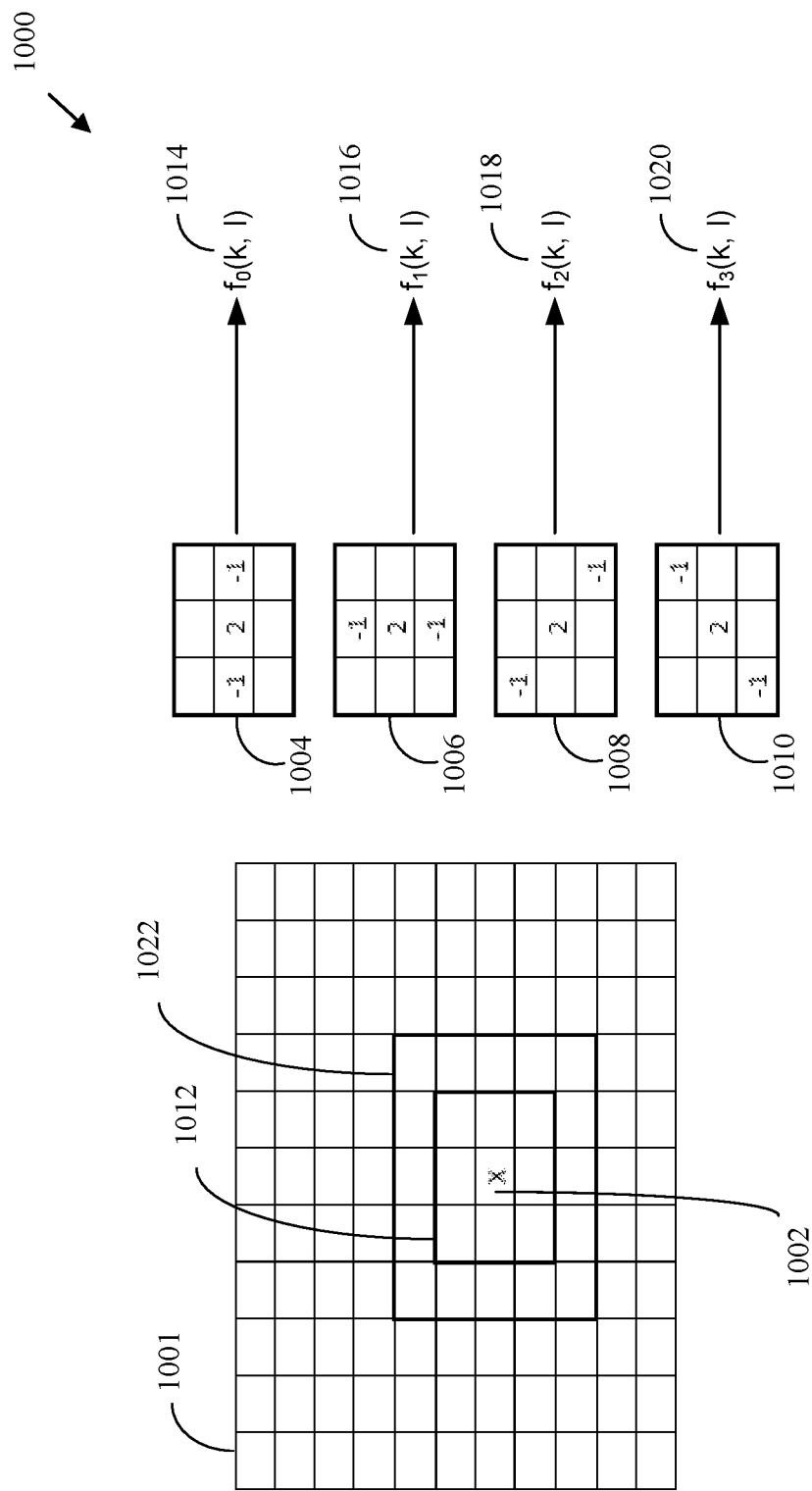
FIG. 10 illustrates an example of obtaining magnitude feature values.

FIG. 10 illustrates an example 1000 of obtaining magnitude feature values. FIG. 10 includes a restoration unit 1001. The restoration unit 1001 is shown as being of size 11×11 pixels. However, the disclosure is not so limited and the restoration unit 1001 can be smaller or larger. In an example, the restoration unit 1001 can have a size of 256×256 pixels for a luma component and a size of 128×128 pixels for chroma component. FIG. 10 illustrates that filters are applied at pixels (i.e., at each of the pixels) of the restoration unit 1001. One such pixel is a pixel 1002, which may be at a location (k, l) within the restoration unit 1001. FIG. 10 illustrates that 4 filters are applied to (or operated at) the pixel 1002 to obtain magnitude feature values. The filters are or include a horizontal filter 1004, a vertical filter 1006, a diagonal filter 1008, and an anti-diagonal filter 1010. While FIG. 10 is described with respect to a number of filters N that is equal to 4, the disclosure is not so limited. N can be larger or smaller than 4. Each of the filters is shown as including the same number of taps (i.e., 3) and the same weights (i.e., $[-1, 2, -1]$). However, that need not be the case. More taps per filter can be used, different weights per filter can be used, or a combination thereof. Each of the filters is operated over a patch 1012 (i.e., a window) around (e.g., surrounding) the pixel 1002 to obtain, respectively, magnitude feature values 1014-1020; namely $f_{n=0}(k, l)$, $f_{n=1}(k, l)$, $f_{n=2}(k, l)$, and $f_{n=3}(k, l)$. Again, four (i.e., n=0, . . . , 3) filters are illustratively used; but more or fewer filters can be used. Thus, in the general case, n=0, . . . , N−1.

Table I illustrates a pseudocode for obtaining the magnitude feature values 1014-1020. Other algorithms for obtaining the magnitude feature values 1014-1020 are possible. The magnitude feature values 1014-1020 are calculated at lines 6-9, respectively, of Table I. In Table I, ru is a 2-dimensional array that holds pixel values of a restoration unit, such as the restoration unit 1001 of FIG. 10. The pseudocode of Table I calculates the magnitude feature values 1014-1020 for the pixel at location (k, l) of the restoration unit.

TABLE I

| 1 | base_value | = 2 * ru(k, l) |
|---|---|---|
| 2 | horizontal_diff | = ru(k − 1, l) + ru(k + 1, l) |
| 3 | vertical_diff | = ru(k, l − 1) + ru(k, l + 1) |
| 4 | anti_diagonal_diff | = ru(k − 1, l + 1) + ru(k + 1, l − 1) |
| 5 | diagonal_diff | = ru(k − 1, l − 1) + ru(k + 1, l + 1) |
| 6 | f0 | = abs( base_value − horizontal_diff) |
| 7 | f1 | = abs( base_value − vertical_diff) |
| 8 | f2 | = abs( base_value − diagonal_diff) |
| 9 | f3 | = abs( base_value − anti_diagonal_diff ) |

After obtaining the magnitude feature values 1014-1020 for each pixel of the restoration unit 1001, classification features $af_n(k, l)$, n=0, . . . , 3, are obtained by averaging the corresponding magnitude feature values $f_n(k, l)$, n=0, . . . , 3 in a window 1022 (i.e., a neighborhood) centered at the pixel (k, l). While the window 1022 is shown as being a 5×5 neighborhood, that need not be the case and smaller or larger neighborhood P×Q can be used. In an example, the neighborhood is a square and, as such, P=Q. The classification features can be obtained using equation (14).

$$af_n(k, l) = \frac{\sum_{p=0}^{P-1}\sum_{q=0}^{Q-1} f_n(i, j)}{P * Q} \quad (14)$$

To restate, each of the magnitude feature values are averaged, as a heuristic, over a window (in this example, a 5×5 window). The classification features $af_n(k, l)$ can be thought as being equivalent to the quantities $|g_i^T p_{k,l}|$ of equation (12). Each of the $af_n(k, l)$, n=0, . . . , 3 can be quantized to obtain quantized features $cf_n(k, l)$, n=0, . . . , 3 using equation (15). The quantized features $c_{fn}(k, l)$ of equation (15) can be thought of as being equivalent to the quantized features $w_i$ obtained in equation (12).

$$cf_n(k, l) = \text{quantize}(af_n(k, l) - \text{threshold}_n) \quad (15)$$

The $cf_n(k, l)$ can be combined, such as described with respect to equation (13), and the output be used as inputs into a lookup table to obtain a non-separable filter $f_{k,l}$ that can be used to filter the pixel at (k, l).

Figure 11:
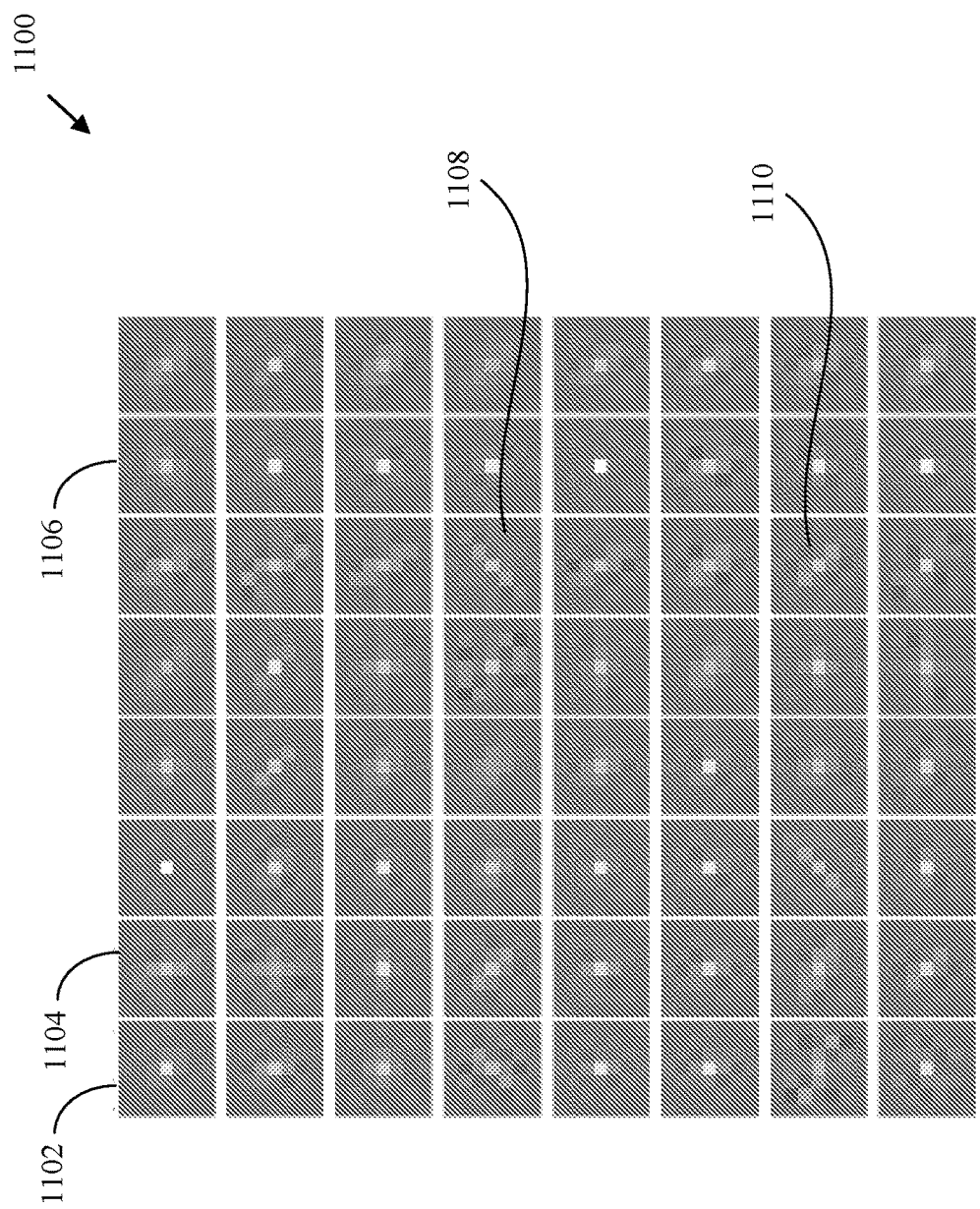
FIG. 11 is an illustration of a portion of a lookup table.

FIG. 11 is an illustration of a portion of a lookup table 1100. The lookup table includes pixel-adaptive filters, illustrated as squares in the FIG. 11. Filters 1102, 1104, and 1106 may correspond to inputs, or be returned by a lookup function that takes as inputs, the values 0, 1, and 2, respectively, corresponding to feature values as described above. At least some of the same filters may be used at different quality levels. As such, it can be observed that similar filters with light variations that address different levels of quantization noise are included in the lookup table 1100. Additionally, as can be observed, some of the filters have directional structure and frequency content (as illustrated by filters 1108-1110, amongst others) that would at best be difficult, if not impossible, to realize using separable versions of such filters.

Figure 12:
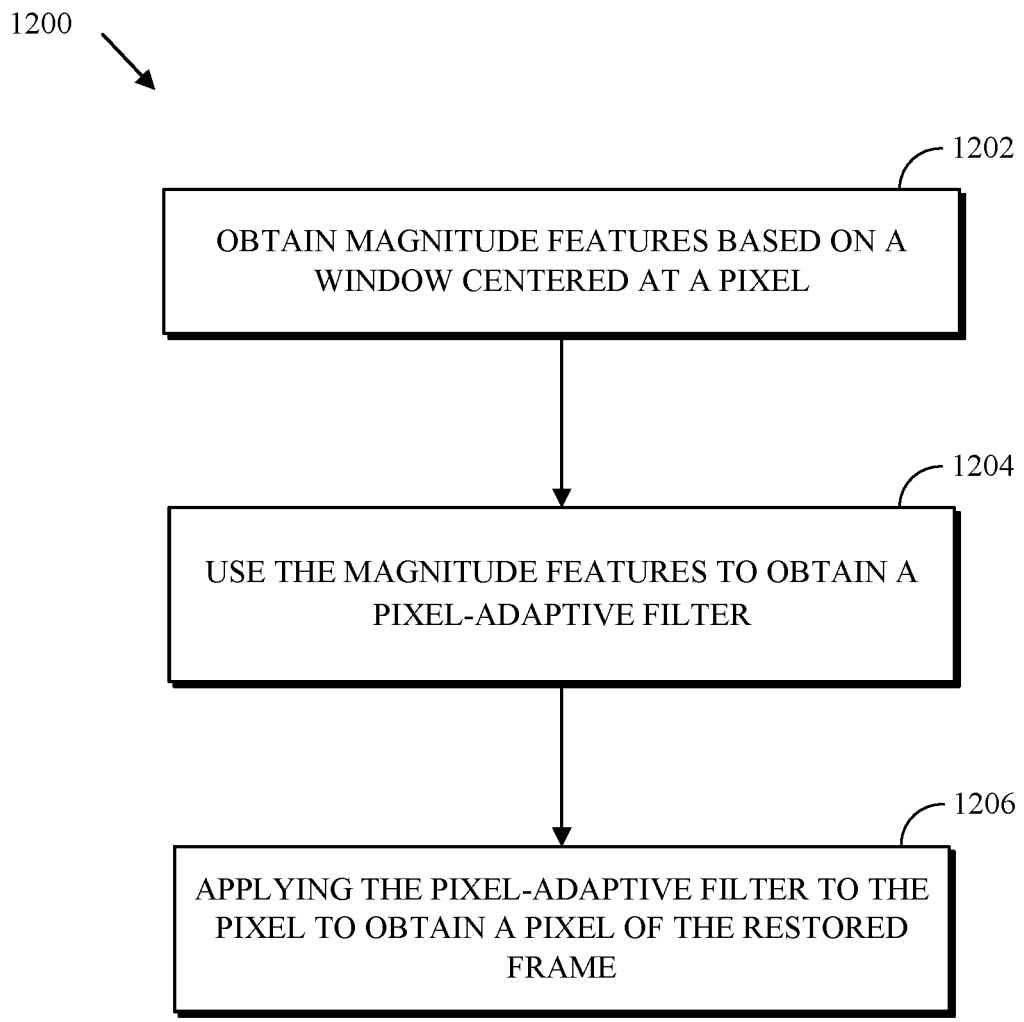
FIG. 12 is a flowchart of a technique for restoring a degraded frame.

FIG. 12 is a flowchart of a technique 1200 for restoring a degraded frame. The technique 1200 can be implemented in a decoder such as the decoder 500 and can be implemented, for example, as a software program that can be executed by computing devices (e.g., apparatuses) such as receiving station 106. The software program can include machine-readable instructions that can be stored in a memory (e.g., a non-transitory computer-readable storage medium) such as the memory 204 or the secondary storage 214, and that can be executed by a processor, such as CPU 202, to cause the computing device to perform the technique 1200. In at least some implementations, the technique 1200 can be performed in whole or in part by the reconstruction stage 510 of the decoder 500 of FIG. 5. In at least some implementations, the technique 1200 can be performed in whole or in part by the loop filtering stage 512 of the decoder 500 of FIG. 5. The technique 1200 can be performed for pixels (e.g., each of the pixels) of a restoration unit. FIG. 12 is described with respect to performing the technique 1200 for a pixel, which may be the pixel 1002 of FIG. 10 of a degraded frame.

At 1202, magnitude features (i.e., magnitude feature values) are obtained based on a window (a first window) centered at the pixel. A cardinality N of the magnitude features is at least 1. In an example, the magnitude features can be the features F (i.e., $|g_i^T p_{k,l}|$) described with respect to equation (12). The window can be the patch 1012 of FIG. 10. In an example, the cardinality of the magnitude features is 4. That is, four features are obtained for the pixel. In an example, the magnitude features can be magnitude feature values 1014-1020 of FIG. 10. As such, the magnitude feature may be obtained as described with respect to Table I.

In an example, the magnitude features can be obtained using filters that include at least two of a horizontal filter, a vertical filter, a diagonal filter, or an anti-diagonal filter, which may be as described with respect to FIG. 10. As such, in an example, each of the filters can be a 3-tap filter that uses the weights [−1, 2, 1].

At 1204, the magnitude features are used to obtain a pixel-adaptive filter. In an example, the magnitude features are used to obtain a pixel-adaptive filter as described with respect to equations (12)-(13). In another example, the magnitude features are used to obtain a pixel-adaptive filter as described with respect to FIG. 10 and equations (14)-(15). As such, using the magnitude features to obtain the pixel-adaptive pixel can include obtaining, for the pixel, N classification features. Each of the N classification features corresponds an average of respective magnitude features of pixels of a second window that is centered at the pixel. The second window can be the window 1022 of FIG. 10. In an example, the first window can have a size 3×3 and the second window can have a size of 5×5.

In an example, using the magnitude features to obtain the pixel-adaptive pixel further can include using the magnitude features to obtain the pixel-adaptive filter from a lookup table. In an example, using the magnitude features to obtain the pixel-adaptive filter from a lookup table can include quantizing at least some of the N classification features and using the at least some of the N classification features to obtain the pixel-adaptive filter from the lookup table.

At 1206, the pixel-adaptive filter can be applied to the pixel to obtain a pixel of the restored frame, as described above with respect to FIGS. 6-9. In an example, obtaining the pixel-adaptive filter, and as described above, can include, combining the pixel-adaptive filter obtained from the lookup table with side filters obtained using side information received from an encoder. The resulting pixel-adaptive filter can be applied to the pixel to obtain the restored pixel of the restored frame.

Returning briefly to FIGS. 6 and 9, the ML model 604 and/or the ML model 904 can each be any type of ML model that is capable of being trained to receive a video frame and output a vector of scalar values or other filter-related information, as described herein. In an example, the ML model 604 and the ML model 904 can each be a neural network. In an example, the neural network can be a deep-learning convolutional ML model (CNN). In a CNN, a feature extraction portion typically includes a set of convolutional operations, which is typically a series of filters that are used to filter an input (e.g., an image) based on a filter (typically a square of size l, without loss of generality). For example, in machine vision (i.e., the processing of an image of a patient's room), these filters can be used to find features in an input image. The features can include, for example, edges, corners, endpoints, and so on. As the number of stacked convolutional operations increases, later convolutional operations can find higher-level features.

In the CNN, a classification portion is typically a set of fully connected layers. The fully connected layers can be thought of as looking at all the input features of an image in order to generate a high-level classifier. Several stages (e.g., a series) of high-level classifiers eventually generate the desired classification output.

As mentioned, a typical CNN network is composed of a number of convolutional operations (e.g., the feature-extraction portion) followed by a number of fully connected layers. The number of operations of each type and their respective sizes is typically determined during a training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

A convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. A convolution layer can use (e.g., create, construct, etc.) a convolution filter that is convolved with the layer input to produce an output (e.g., a tensor of outputs). A Dropout layer can be used to prevent overfitting by randomly setting a fraction of the input units to zero at each update during a training phase. A Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The activation function may be a linear function or non-linear function (e.g., a sigmoid function, an arcTan function, a tanH function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 can also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for obtaining a restored frame from a degraded frame, comprising:
   obtaining, for a pixel of the degraded frame, magnitude features based on a first window centered at the pixel, wherein a cardinality N of the magnitude features is at least 1;
   using the magnitude features to obtain a pixel-adaptive filter, wherein using the magnitude features to obtain the pixel-adaptive pixel comprises:
     obtaining, for the pixel, N classification features, wherein each of the N classification features corresponds to an average of respective magnitude features of pixels of a second window that is centered at the pixel; and
   applying the pixel-adaptive filter to the pixel to obtain a pixel of the restored frame.

2. The method of claim 1, wherein a cardinality of the magnitude features is 4.

3. The method of claim 1, wherein the magnitude features are obtained using filters comprising at least two of a horizontal filter, a vertical filter, a diagonal filter, or an anti-diagonal filter.

4. The method of claim 1, wherein each of the filters is a 3-tap filter that uses weights [−1, 2, 1].

5. The method of claim 1, wherein the second window is different from the first window.

6. The method of claim 1, wherein the first window has a size of 3×3, and the second window has a size of 5×5.

7. The method of claim 1, wherein using the magnitude features to obtain the pixel-adaptive pixel further comprises:
using the magnitude features to obtain the pixel-adaptive filter from a lookup table.

8. The method of claim 1, wherein using the magnitude features to obtain the pixel-adaptive filter comprises:
quantizing at least some of the N classification features; and
using the at least some of the N classification features to obtain the pixel-adaptive filter from a lookup table.

9. A device, comprising:
a processor, the processor configured to:
obtain, for a pixel of a degraded frame, magnitude features based on a first window centered at the pixel, wherein a cardinality N of the magnitude features is at least 1;
use the magnitude features to obtain a pixel-adaptive filter, wherein to use the magnitude features to obtain the pixel-adaptive pixel comprises to:
obtain, for the pixel, N classification features, wherein each of the N classification features corresponds to an average of respective magnitude features of pixels of a second window that is centered at the pixel; and
apply the pixel-adaptive filter to the pixel to obtain a pixel of a restored frame.

10. The device of claim 9, wherein a cardinality of the magnitude features is 4.

11. The device of claim 9, wherein the magnitude features are obtained using filters comprising at least two of a horizontal filter, a vertical filter, a diagonal filter, or an anti-diagonal filter.

12. The device of claim 9, wherein each of the filters is a 3-tap filter that uses weights [−1, 2, 1].

13. The device of claim 9, wherein the first window has a size of 3×3, and the second window has a size of 5×5.

14. The device of claim 9, wherein to use the magnitude features to obtain the pixel-adaptive pixel further comprises to:
use the magnitude features to obtain the pixel-adaptive filter from a lookup table.

15. The device of claim 14, wherein to use the magnitude features to obtain the pixel-adaptive filter from a lookup table comprises to:
quantize at least some of the N classification features; and
use the at least some of the N classification features to obtain the pixel-adaptive filter from the lookup table.

16. A non-transitory computer-readable storage medium, comprising executable instructions that, when executed by a processor, cause performance of operations for obtaining a restored frame from a degraded frame, comprising:
obtaining, for a pixel of the degraded flame, magnitude features based on a first window centered at the pixel, wherein a cardinality N of the magnitude features is at least 1:
using the magnitude features to obtain a pixel-adaptive filter, wherein using the magnitude features to obtain the pixel-adaptive pixel comprises:
obtaining, for the pixel, N classification features, wherein each of the N classification features corresponds to an average of respective magnitude features of pixels of a second window that is centered at the pixel; and
applying the pixel-adaptive filter to the pixel to obtain a pixel of the restored frame.

17. The non-transitory computer-readable storage medium of claim 16, wherein the magnitude features are obtained using filters comprising at least two of a horizontal filter, a vertical filter, a diagonal filter, or an anti-diagonal filter.

18. The non-transitory computer-readable storage medium of claim 16, wherein the first window has a size of 3×3, and the second window has a size of 5×5.

19. The non-transitory computer-readable storage medium of claim 16, wherein using the magnitude features to obtain the pixel-adaptive pixel further comprises:
using the magnitude features to obtain the pixel-adaptive filter from a lookup table.

20. The non-transitory computer-readable storage medium of claim 1, wherein using the magnitude features to obtain the pixel-adaptive filter comprises:
quantizing at least some of the N classification features; and
using the at least some of the N classification features to obtain the pixel-adaptive filter from a lookup table.

* * * * *